United States Patent
Mori et al.

(10) Patent No.: US 6,465,563 B1
(45) Date of Patent: Oct. 15, 2002

(54) ONE COMPONENT WATERBORNE COATING WITH IMPROVED CHEMICAL RESISTANCE

(75) Inventors: Nobuhiro Mori, Westmont; Michael Leonard, Lansing, both of IL (US); Blake Burich, Portage, IN (US); Michael Jackson, LaGrange, IL (US); Robert Kooy, Lansing, IL (US); Manabu Ozawa, Aichi-ken (JP); Toru Tanaka, Nagoyo (JP); Takumi Kitagawa, Owariasahi (JP); Ikuo Asato, Darien, IL (US); Jeff Makarewicz, Allen Park, MI (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/667,822

(22) Filed: Sep. 22, 2000

Related U.S. Application Data

(63) Continuation of application No. 08/918,971, filed on Aug. 27, 1997, now abandoned.

(51) Int. Cl.$^7$ .................................................. C08L 75/04
(52) U.S. Cl. ....................... 524/507; 524/457; 524/502; 524/589
(58) Field of Search ................................... 524/507, 457

(56) References Cited

U.S. PATENT DOCUMENTS

| | | | | |
|---|---|---|---|---|
| 5,424,355 A | * | 6/1995 | Uemae et al. | ............... 524/507 |
| 5,571,861 A | * | 11/1996 | Klein et al. | ................. 524/591 |

* cited by examiner

*Primary Examiner*—Judy M. Reddick

(57) ABSTRACT

A coating composition particularly suitable for coating poly (phenylene oxide) comprises aqueous medium-dispersed particles of: A) between about 30 and about 35 wt %, of a first styrene-acrylic polymer formed of monomers, between about 50 and about 80 mole % of which monomers are styrene or substituted styrene monomers, between about 2 and about 15 mole percent of which monomers are acrylonitrile, and between about 18 and about 48 mole percent of which are acrylic monomers, said first styrene-acrylic polymer having an acid number of about 15 or below; B) between about 30 and 35 wt %, of an acrylic second polymer formed of monomers, at least about 90 mole percent of which monomers are acrylate monomers, balance other α, β-ethylenically unsaturated monomers, said acrylic second polymer having an acid number between 0 and about 25; and C) between about 30 and about 40 wt % of an acrylic-urethane hybrid polymer.

2 Claims, No Drawings

ONE COMPONENT WATERBORNE COATING WITH IMPROVED CHEMICAL RESISTANCE

"This is a continuing application of application Ser. No. 08/918,971" filed Aug. 27, 1997 now abandon.

The present invention is directed to a waterborne lacquer particularly formulated for interior automotive use, and more particularly to a waterborne lacquer which adheres to poly(phenylene oxide)-based materials and which resists chemicals, particularly grease.

BACKGROUND OF THE INVENTION

A type of plastic material which is commonly used to form automotive parts, e.g. instrument panels, is based on poly(phenylene oxide) (PPO). PPO is sold, for example, under the trademark Noryl®, Noryl® STN 15HF being a commonly used example. Such materials are notoriously difficult to coat as many common coatings do not adhere well to PPO.

Interior automotive parts are frequently exposed to oils and grease, whether the natural oils of occupants' skin or oils and grease of food products occupants may bring into the vehicle.

Accordingly, it is a general object of the invention to provide a coating which adheres well to PPO-based materials and resists chemicals, particularly oils and grease.

SUMMARY OF THE INVENTION

A waterborne coating comprises aqueous medium-dispersed particles of

A) between about 30 and about 35 wt %, of a first styrene-acrylic polymer formed of monomers, between about 50 and about 80 mole % of which monomers are styrene or substituted styrene monomers, between about 2 and about 15 mole percent of which monomers are acrylonitrile, and between about 18 and about 48 mole percent of which are acrylic monomers, that is acrylic acid or substituted acrylic acids and esters of acrylic acid and substituted acrylic acids, said first styrene-acrylic polymer having an acid number of about 15 or below, preferably between about 5 and about 10;

B) between about 30 and 35 wt %, of an acrylic second polymer formed of monomers, at least about 90 mole percent of which monomers are acrylate monomers, balance other α,β-ethylenically unsaturated monomers, said acrylic second polymer having an acid number between 0 and about 25, preferably between about 10 and about 20; and C) between about 30 and about 40 wt % of an acrylic-urethane hybrid polymer.

DETAILED DESCRIPTION OF CERTAIN PREFERRED EMBODIMENTS

While the precise contribution of the three polymers cannot be determined, generally, it is found that styrene-acrylic polymer A) provides the coating with good chemical resistance and aids in adhesion to PPO; acrylic polymer B) provides the coating with good grease resistance; and acrylic-urethane hybrid polymer C) provides the coating with strong adhesion to PPO and film formation characteristics. It is found that the proportions of the three polymers is critical for providing both good adhesion to PPO and grease resistance, as compositions formulated with similar components, but with different proportions, do not provide the desired combination of properties, particularly adhesion and grease-resistance.

Polymer A) and polymer B) are each formed from α,β-ethylenically unsaturated monomers by conventional emulsion polymerization techniques, such as is taught in U.S. Pat. No. 3,929,743, the teachings of which are incorporated herein by reference. Suitable acrylic monomers for forming polymers A) and B), depending on the requisite functionality of these polymers include, but are not limited to acrylic acid, methacrylic acid, n-butyl methacrylate, n-butyl acrylate, methyl methacrylate, acrylonitrile, styrene, α-methyl styrene, vinyl toluene.

Although both polymer A) and polymer B) have low acid numbers, each preferably has sufficient carboxylic acid functionality such that each forms a stable dispersion when neutralized with ammonia or an amine. Accordingly, generally very little or no surfactant is necessary to disperse either polymer A) or B). A non-ionic surfactant, such as an alkylene oxide-based surfactant, may be added to a dispersion of A) and/or B) to further stabilize the dispersion; however, it is desired that surfactant be minimized or eliminated for best water and chemical resistance of the resultant coating.

A commercially available emulsion polymer suitable as Polymer A) is Zeneca® A6075 Acrylic. On analysis, the monomer content of this polymer is found to be approximately 65 mole percent styrene and a-methyl styrene, 25 mole percent n-butyl acrylate, and 10 mole percent acrylonitrile.

A commercially available emulsion polymer suitable as Polymer B) is Zeneca® A6015 Acrylic. On analysis, the monomer content of this polymer if found to be approximately 61 mole percent n-butyl methacrylate, 39 mole percent methyl methacrylate, and low/trace amounts of n-butyl acrylate and methacrylic acid. Also a trace amount of an ethylene oxide-based surfactant was detected.

The two commercial polymers listed above are of high molecular weight having weight average molecular weights above a million each. These polymers have glass transition temperatures ($T_g$s) within the range of 20° C.–120° C., and each appears to have multiple glass transition temperatures.

Acrylic-urethane hybrid polymer C) may be produced in accordance with U.S. Pat. No. 5,571,857 to Gruber et al., the teachings of which are incorporated herein by reference. Production of such a polymer is described therein as follows:

(a) reacting a polyol and isophorone diisocyanate to consume essentially all of the polyol hydroxyl functionality;

(b) adding an isocyanate-reactive compound containing a carboxylic functionality and reacting it with isophorone diisocyanate, the amount of isophorone diisocyanate present in steps (a) and (b) being sufficent to yield an isocyanate-terminated polyurethane prepolymer having an isocyanate content of greater than 0 wt. %;

(c) adding at least one acrylic monomer during the step (b) prepolymer forming reaction;

(d) neutralizing the carbox lic-containing prepolymer with a tertiary amine to yield a prepolymer salt/acrylic monomer mixture;

(e) dispersing the prepolymer salt/monomer mixture in water;

(f) adding a free-radical source and a chain-terminator/extender composition comprising a monofunctional and a difunctioanl amine; and (g) polymerizing the acrylic monomer and completing chain extension of the prepolymer by heating the aqueous dispersion.

Preferably, steps (a)–(b) are performed in the absence of an organic cosolvent.

Such an acrylic-urethane polymer C) is sold commercially by Air Products as Hybridur® 560. Analysis identifies monomer components of this polymer as adipic acid, iso and/or terephthalic acid, neopentyl glycol, styrene, butyl acrylate, α-methyl styrene, and 4,4'-dicyclohexylmethane diisocyanate ($H_{12}MDI$). Suitable acrylic-urethane polymers are also described in U.S. Pat. No. 5,137,526 to Vijayendran et al., the teachings of which are incorporated herein by reference.

The composition of the present invention may be produced merely by mixing dispersions of polymers A), B), and C) together in an appropriate ratio.

While it is desirable to keep the volatile organic content (VOC) of the coating composition low so as to meet environmental requirements, it is preferred to add some coalescing solvent, i.e., between about 78 and about 89 wt % relative to the total weight of the resin solids (calculated as 100% total). Such coalescing solvents include, but are not limited to glycol ethers and certain other water miscible organic solvents. A currently preferred coalescing solvent is N-methyl-2 pyrrolidone (NMP).

Coating compositions according to the present invention may contain up to about 127 wt % fillers and/or pigments relative to total resin solids (calculated as 100%). It is found in some cases that the use of talc at between 24 and about 31 wt % relative to total resin solids improves coating performance, particularly adhesion.

The coating composition is typically produced at a solids level of between about 37 and about 45 wt %, but is typically let down, i.e., to between about 36 and about 38 wt % solids, for spray coating.

In a preferred coating protocol, the coating is let down to between 36 and 38 wt % solids and applied at room temperature so as to provide a film thickness between 20 and 25 microns. The coating is maintained at room temperature at a flash time of 3–5 minutes and then subjected to a temperature of 70° C. at a keep time of 5 minutes.

The invention will now be described in greater detail by way of specific examples:

EXAMPLES 1 and 2

An oak-colored (Example 1) set and a bluish grey (Example 2) formulation in accordance with the invention are set forth below with the amounts expressed as weight percent of total formula weight. In each case, resins A), B), and C) are used at a weight ratio of 32.5:32.5:35.

| Example 1 (oak) | |
|---|---|
| 13.58 | Acrylic resin A - Zeneca A6075 acrylic |
| 13.58 | Acrylic resin B - Zeneca A6015 acrylic |
| 14.59 | Urethane resin U - Air Product Hybridur 560 |
| 19.93 | MAC* m-pyrol cosolvent blend |
| 1.50 | Rohm & Haas alkali swellable thixotrope |
| 0.59 | MAC polyethylene emulsion |
| 1.33 | T.H. Hilson polyethylene wax powder |
| 13.59 | Nippon Talc Company Magnesium silicate dispersion |
| 6.25 | MAC waterbase dispersion - Titanium dioxide white |
| 2.65 | MAC waterbase dispersion - Carbon black |
| 1.06 | MAC waterbase dispersion - Iron oxide yellow |

| Example 1 (oak) -continued | |
|---|---|
| 2.28 | MAC waterbase dispersion - Trans red oxide |
| 4.07 | MAC waterbase dispersion - Monoazo orange |
| 5.00 | SCM Chemical flattening silica |
| 100.00 | |

*Morton Automotive Coatings, a division of Morton International, Inc.

| Example 2 (Bluish Grey) | |
|---|---|
| 14.00 | Acrylic resin A - Zeneca A6075 acrylic |
| 14.00 | Acrylic resin B - Zeneca A6015 acrylic |
| 15.01 | Urethane resin U - Air Products Hybridur 560 |
| 19.39 | MAC m-pyrol cosolvent blend |
| 1.50 | Rohm & Haas alkali swellable thixotrope |
| 0.50 | MAC polyethylene emulsion |
| 1.10 | T.H. Hilson polyethylene wax powder |
| 13.58 | Nippon Talc Company Magnesium silicate dispersion |
| 5.64 | MAC waterbase dispersion - Titanium dioxide white |
| 2.38 | MAC waterbase dispersion - Carbon black |
| 4.25 | MAC waterbase dispersion - Organic Phthalo blue |
| 2.94 | MAC waterbase dispersion - Inorganic red |
| 0.73 | MAC waterbase dispersion - Iron oxide yellow |
| 4.98 | SCM Chemical flattening Silica |
| 100.00 | |

What is claimed is:

1. A coating composition comprising aqueous medium-dispersed particles of

A) between about 80 and about 35 wt % of a first styrene-acrylic polymer formed of monomers, between about 50 and about 80 mole percent of which monomers are styrene or α-methyl styrene, between about 2 and about 15 mole percent of which monomers are acrylonitrile, and between about 18 and about 48 mole percent of which are acrylic monomers selected from the group consisting of acrylic acid, methacrylic acid, esters of acrylic acid, esters of methacrylic acid, and mixtures thereof, said first styrene-acrylic polymer having an acid number of about 15 or below and a glass transition temperature between about 20 and about 120 degrees C.;

B) between about 30 and 35 wt % of an acrylic second polymer formed of monomers, at least about 90 mole percent of which monomers are acrylate monomers, balance other a,B-ethylenically unsaturated monomers, said acrylic. second polymer having an acid number between 0 and about 25 and a glass transition temperature between about 20 and about 120 degrees C.; and C) between about 30 and about 40 wt % of an acrylic-urethane hybrid polymer, said weight percentages based upon the total weight of A plus B plus C.

2. A coating for polyphenylene oxide with the composition of claim 1.

\* \* \* \* \*